United States Patent [19]

Manmoto et al.

[11] Patent Number: 4,669,150
[45] Date of Patent: Jun. 2, 1987

[54] METHOD OF BONING A DARK MEAT OF A CHICKEN BY A BELT-SHAPED CUTTER AND APPARATUS FOR IMPLEMENTING THE METHOD

[75] Inventors: Shinzo Manmoto, Funabashi; Yasutaka Iwasaki, Saku, both of Japan

[73] Assignees: Mayekawa Mfg. Co.; Livestock Facilities Modernizing Lease Foundation, both of Tokyo, Japan

[21] Appl. No.: 886,795

[22] Filed: Jul. 18, 1986

Related U.S. Application Data

[63] Continuation-in-part of Ser. No. 762,070, Jul. 25, 1985, abandoned.

[30] Foreign Application Priority Data

Nov. 29, 1983 [JP] Japan ................... 58-223354
Nov. 29, 1983 [JP] Japan ................... 58-223355
Nov. 29, 1983 [JP] Japan ................ 58-183100[U]

[51] Int. Cl.⁴ ..................... A22C 21/00; A22C 17/04
[52] U.S. Cl. ................................ 17/46; 17/1 G; 17/11
[58] Field of Search ................ 17/46, 11, 1 G

[56] References Cited

U.S. PATENT DOCUMENTS 4,422,216 12/1983 Spötzl ........................... 17/1 G

FOREIGN PATENT DOCUMENTS 1118644 11/1961 Fed. Rep. of Germany ....... 17/1 G
2226933 11/1974 France ............................ 17/1 G Primary Examiner—Willie G. Abercrombie
Attorney, Agent, or Firm—Cushman, Darby & Cushman

[57] ABSTRACT

In the process of boning a poultry leg (including a thigh bone and tibia) or separating the bones from the meat using a belt-shaped cutter, the poultry leg is held in such a manner that the thigh bone and tibia form a predetermined angle between them. The belt-shaped cutter is wounded on the bone, and slides along the extending direction of the thigh bone and tibia while the opposite ends of the belt are moved reciprocally alternately, whereby the bone is separated from the meat. At the pre-processing stage, the poultry leg has been severed by means of a cutting device such as knife, etc. along the extending direction of the bone at the opposite side thereof to that on which the belt-shaped cutter is wound, so that the meat thus cut depends down from the severing line owing to its own weight. Therefore, the meat portion not yet thus severed and surrounding the bone is separated by means of the belt-shaped cutter.

7 Claims, 18 Drawing Figures

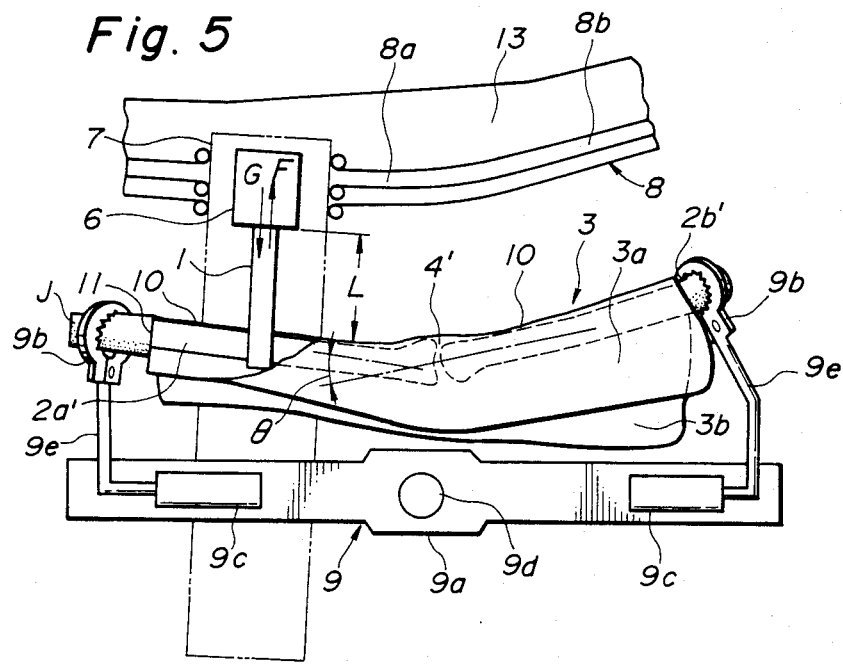
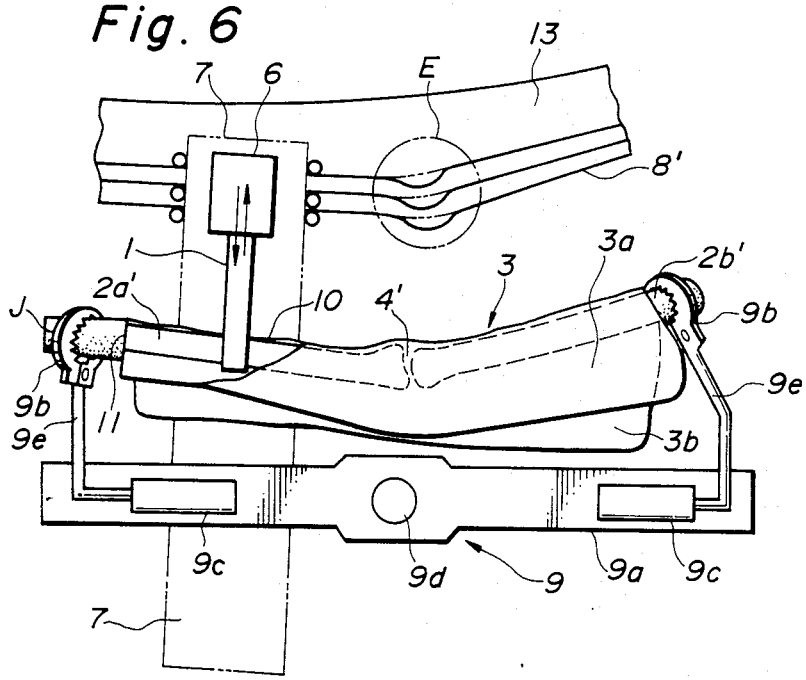

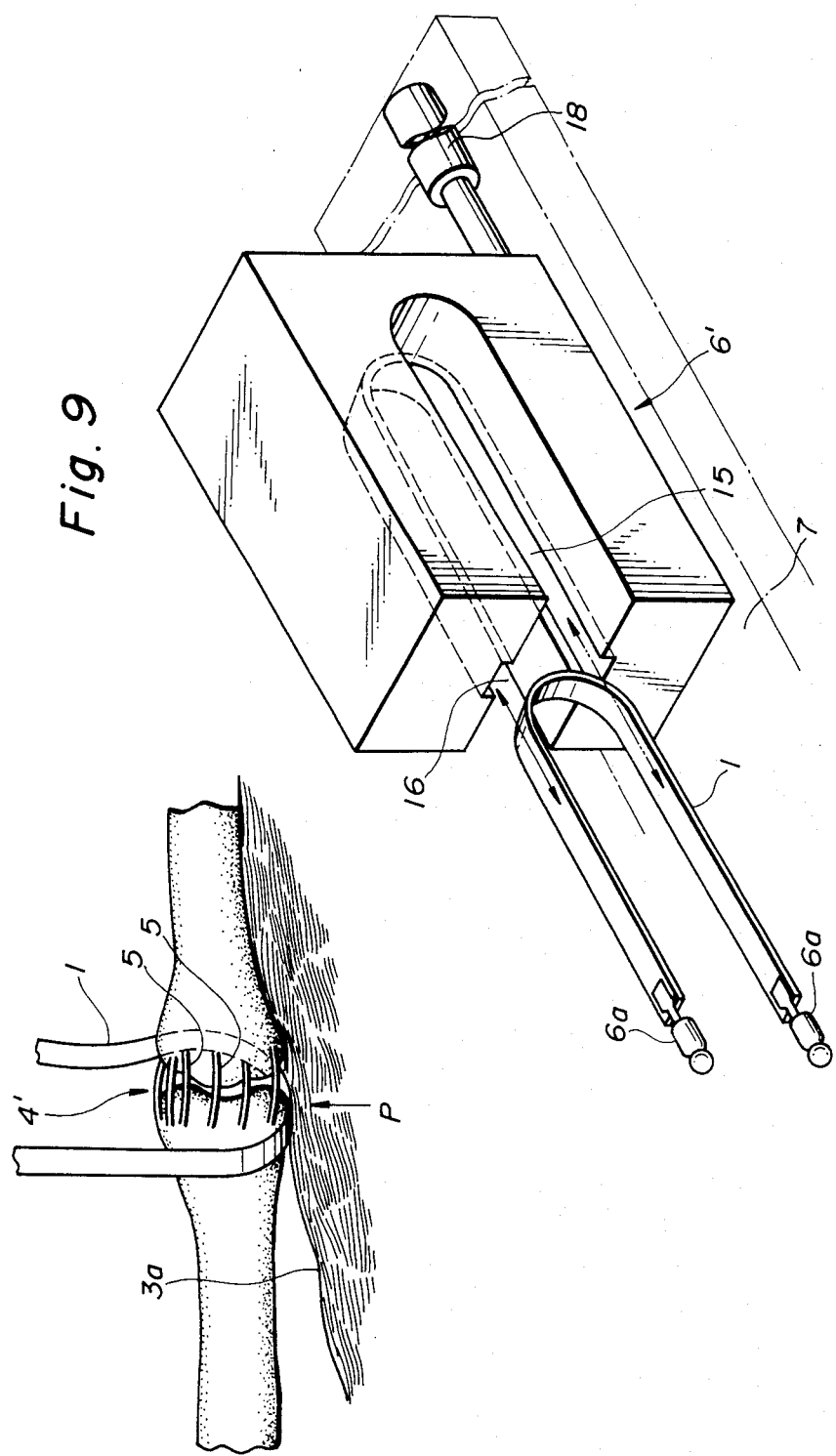

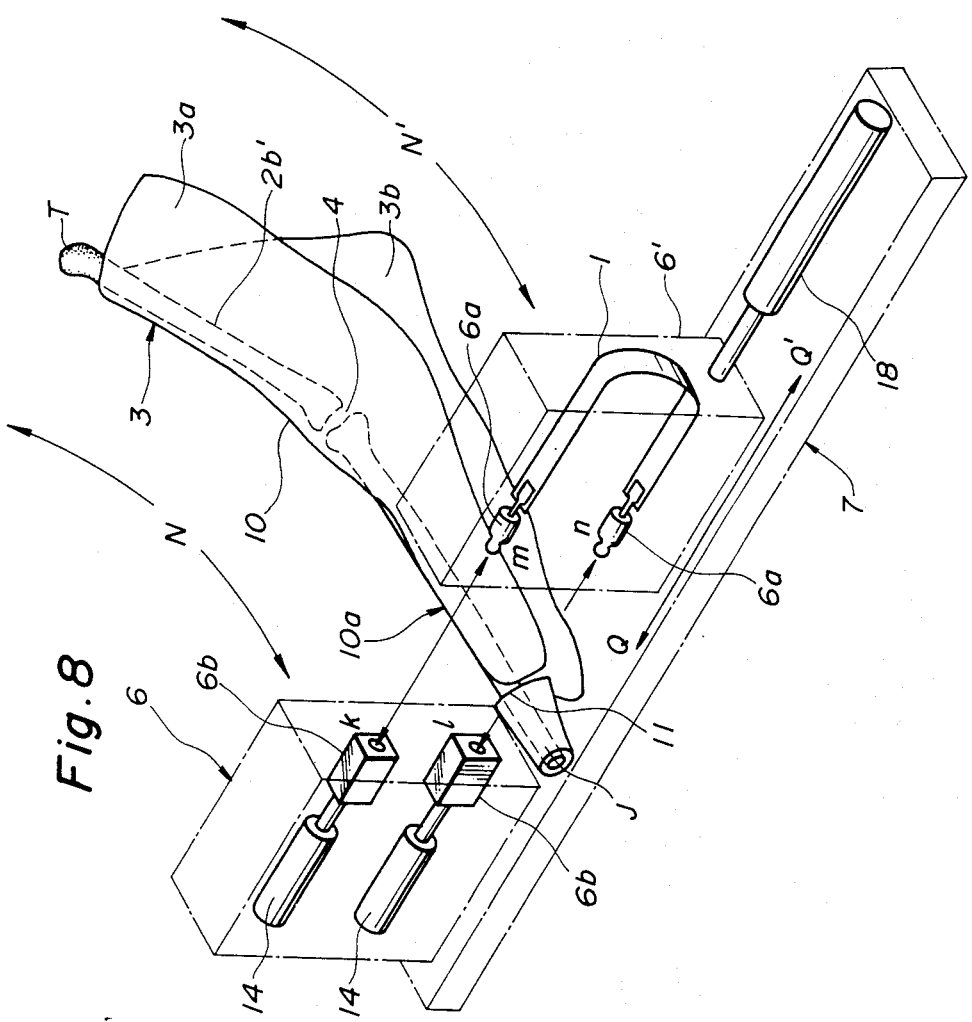

Fig. 14     Fig. 15     Fig. 16
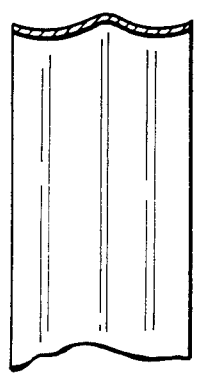
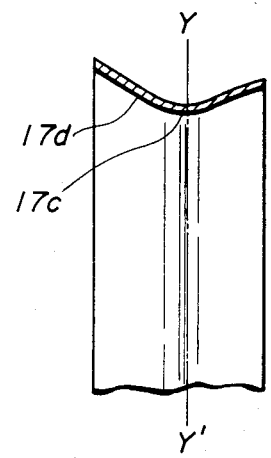
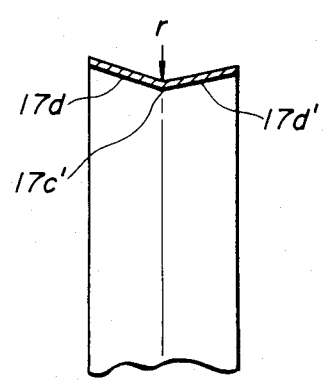
Fig. 17
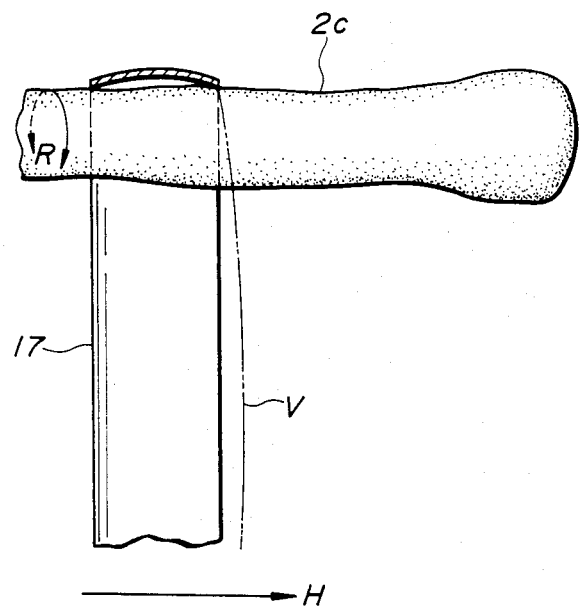

METHOD OF BONING A DARK MEAT OF A CHICKEN BY A BELT-SHAPED CUTTER AND APPARATUS FOR IMPLEMENTING THE METHOD

This application is a continuation-in-part of the U.S. patent application Ser. No. 762, 070 filed on July 25, 1985, and now abandoned.

BACKGROUND OF THE INVENTION (a) Field of the Invention

The present invention relates to a method of boning the dark meat of a chicken by a belt-shaped cutter and to an apparatus for implementing the method.

(b) Description of the Prior Art

These days, the breeding and slaughting, and handling and processing as well, of edible fowl have been rapidly increasing in scale along the continual expansion of convenience food market. In this field of industry, many different processings have been automated and are under automation; however, the separation of meat from the bone of raw thigh meat, namely, boning of poultry leg is yet done manually. The reason why the boning of poultry leg by machine or automated boning has not yet been successfully established lies in the fact that such meats are different in shape from one to another. Namely, this difference makes it difficult to separate the meat from the bone without visual checking and manual cutting. The automation of this boning process needs many feedback sensors and a large-scale computer; however, such a system is very expensive and does not economically pay.

Recently, however, a method of boning the poultry leg using a belt-shaped cutter has been developed. By applying this method in practice, a capability of automatically boning poultry leg has been provided.

This boning technique will be outlined in the following, referring to FIG. 1.

The belt-shaped cutter 1 is wound nearly perpendicularly on the bone 2a of a poultry leg 3, and it is moved circumferentially (in the direction of arrow R) along the surface of the bone 2a. In this example, the belt-shaped cutter 1 is reciprocally driven mainly in the directions of arrows F and G. As moved in this way, the belt-shaped cutter 1 will work to separate the meat from the bone not by drawing the bone, but by making a cut between the bone and meat. Consequently, by sliding the belt-shaped cutter on the bone axially thereof as indicated with the arrow B and a slower speed than in the above-mentioned circumferential direction, it is possible to separate the bone 2a and meat 3a from each other with a relatively small force.

Since it has a width W, when it comes near to the joint 4, the belt-shaped cutter 1 can successfully separate the meat 3a from the bones 2a and 2b along the envelope defined by the bone ends as shown with the arrow D with the ligaments 5 remained attached to the bones 2a and 2b and without cutting in, or falling in between, these bones 2a and 2b.

However, there are several problems to be solved in adopting this method for boning of the poultry leg.

One of the problems is the difficulty in keeping the two bones, namely, thigh bone and tibia, in the poultry leg arranged in a straight line. The explanation will be made with reference to FIG. 2. In case of the poultry leg, the tibia $2a'$ corresponds to said bone 2a, the thigh bone $2b'$ to said bone 2b, and the knee joint $4'$ to said joint 4. When it is tried to put the thigh bone $2b'$ and tibia $2a'$ in a straight line, a limit will be encountered in the bending angle of the knee joint $4'$. The angle $\theta$ shown will be not less than 15° unless such a large force as would destroy the joint tissue is applied to the knee joint.

With an apparatus 6 so constructed that a belt-shaped cutter 1 is held at both ends thereof and driven reciprocally as indicated by the arrows G and F, smooth boning of any poultry leg could not be done unless the belt 1 can be moved along the tibia $2a'$ and then the thigh bone $2b'$ while being kept perpendicular to the bones $2a'$ and $2b'$ with the belt tension kept constant.

Another problem is found in the fact that the bones in poultry leg are thick at their portions near the knee joint $4'$. In case many poultry legs are boned in succession, it is difficult to pass the portion wound on the bone of the belt-shaped cutter 1 along the profile of the bones in all the polutry legs since the polutry legs have the knee joints $4'$ different in thickness from one leg to another.

For working out a practically automatic boning machine adopting the above-mentioned method, it is essential that the belt-shaped cutter 1 can be easily and efficiently wound on the bone 2a in the preliminary step of the boning procedure, and also that the belt-shaped cutter can be easily and efficiently removed from the bone after the separation of the meat from the bone. Otherwise, the efficiency of subsequent meat processing will be low.

For winding on the bone and circumferential moving of the belt-shaped cutter 1, the cutter must be made of a thin elastic material such as spring steel, stainless steel, synthetic resin, etc. If it is not, the cutter could not be smoothly moved on the bone. When the belt-shaped cutter 1 wound on the bone 2a is reciprocally driven by a drive unit 6 in the directions of arrows G and F while the drive unit 6 is moved over a distance $L_1$ rightward as indicated with an arrrow H with both ends of the belt-shaped cutter 1 connected to the drive unit 6, the portion wound on the bone 2a of the belt-shaped cutter 1 also slides rightward, but the belt edge having been longitudinally straight is deflected like bow, resulting in a move of the wound portion of the belt over a distance $L_2$, because the belt-shaped cutter 1 is made of a thin elastic material. The distance $L_2$ is smaller than that $L_1$. Thus, the portion wound on the bone 2a of the belt-shaped cutter 1 cannot precisely follow up with the movement of the drive unit, with the reduction in efficiency of boning. The lateral edge 1a of the belt-shaped cutter 1 may not be provided with any too sharp blade. The reason is that if a sharp blade is provided on the lateral edge 1a of the belt-shaped cutter 1, when the belt-shaped cutter 1 wound on the bone 2a is slid reciprocally in the direction of arrow B, the belt will not slide on the ligaments 5 as indicated with the arrow B but it will cut into the ligaments 5 and bones 2a, performing no stable boning function. However, if the blade on the lateral edge 2a of the belt-shaped cutter 1 is too dull, the efficiency of boning decreases.

The blade provided on the lateral edge 1a of the belt-shaped cutter 1 should be neither too sharp nor too dull.

SUMMARY OF THE INVENTION

The present invention is proposed to overcome the above-mentioned drawbacks of the prior art and has the object to provide a method of boning a dark meat of a chicken by means of a belt-shaped cutter, by which the bone and meat can be smoothly and effectively separated from each other, and also an apparatus for effecting this method.

Another object of the present invention is to provide a boning method and apparatus in which the belt-shaped cutter does not cut into the dark meat of a chicken or poultry leg at the knee joint thereof.

Further object of the present invention is to provide a boning apparatus provided with a mechanism by which the belt-shaped cutter can be smoothly wound on the bone at the pre-processing stage of boning a poultry leg and also it can be smoothly removed for preparation of the boning for a next or another poultry leg.

Still further object of the present invention is to provide a belt-shaped cutter having a shape optimum for implementing the above-mentioned boning method.

These and other objects and advantages of the present invention will be better understood from the ensuing description made by way of example of the preferred embodiments with reference to the drawings.

BRIEF DESCRIPTION OF THE DRAWINGS

FIG. 5 is a schematic diagram of one embodiment of an apparatus for implementing the inventive boning method;

FIG. 6 is also a schematic diagram of another embodiment according to the present invention, including a variation of the profiling templet in the embodiment shown in FIG. 5;

FIG. 7 is an explanatory diagram of the belt-shaped cutter used in boning by the apparatus shown in FIG. 6, the belt-shaped-cutter being in the loosened position;

FIG. 8 is a schematic perspective view of a device for attaching the belt-shaped cutter in the boning apparatus shown in FIG. 5 to the drive unit;

FIG. 9 is a schematic perspective view of the holder for the belt-shaped cutter;

FIG. 11 (b) is an illustration explaining the action of the disk blade of the cutting device;

FIGS. 14 to 16 are schematic sectional views showing variations, respectively, of the belt-shaped current; and FIG. 17 explains the action of the belt-shaped cutter in case is is used as wounded on the bone for the arced portion thereof to be convex with respect to the bone.

DETAILED DESCRIPTION OF THE PREFERRED EMBODIMENTS

Figure 1:
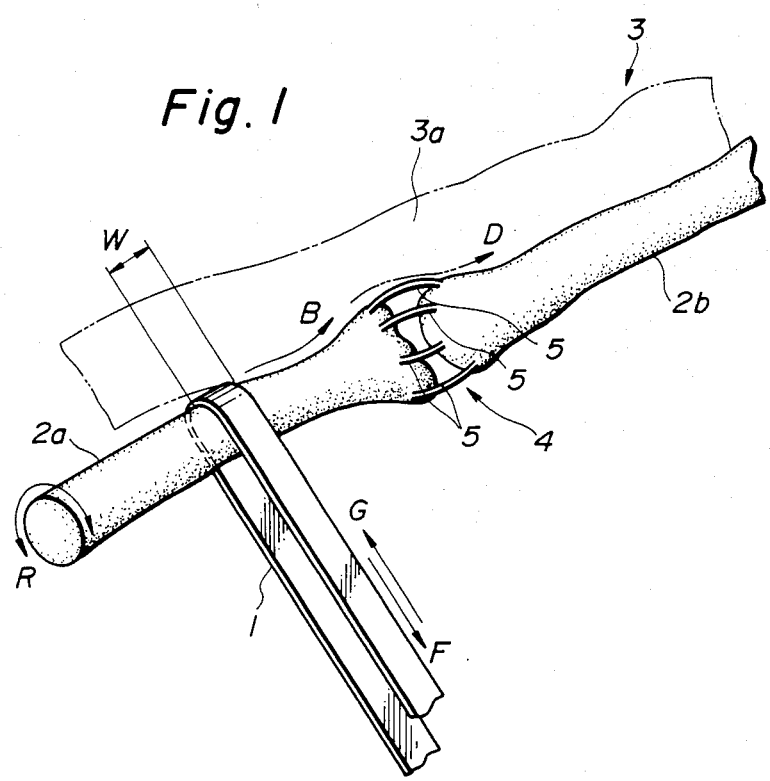
FIG. 1 is an explanatory drawing of a boning method using a belt-shaped cutter.
Figure 2:
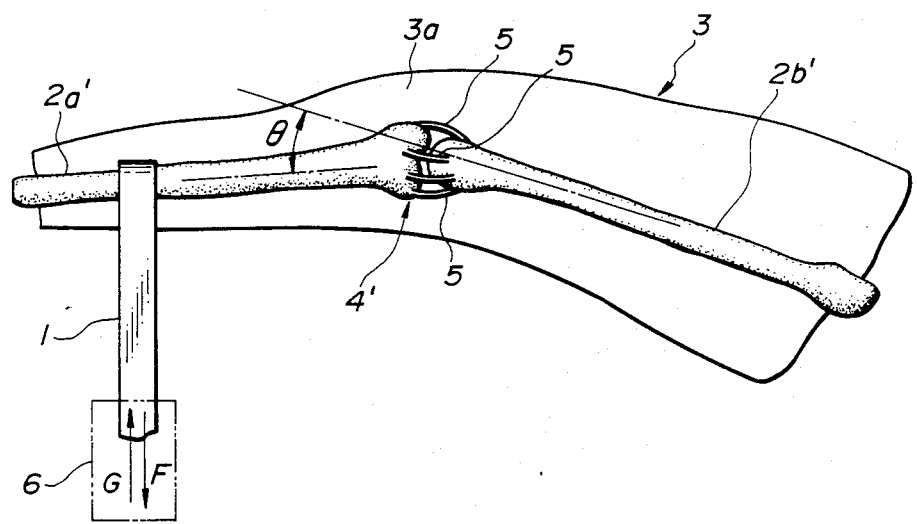
FIGS. 2 to 4 are schematic diagrams explaining the technical problems in the boning method shown in FIG. 1.
Figure 3:
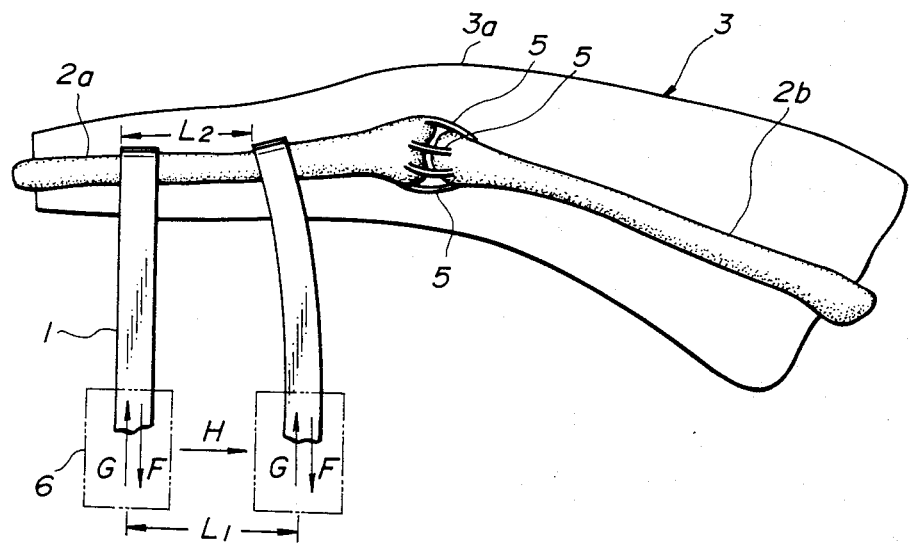
Figure 4:
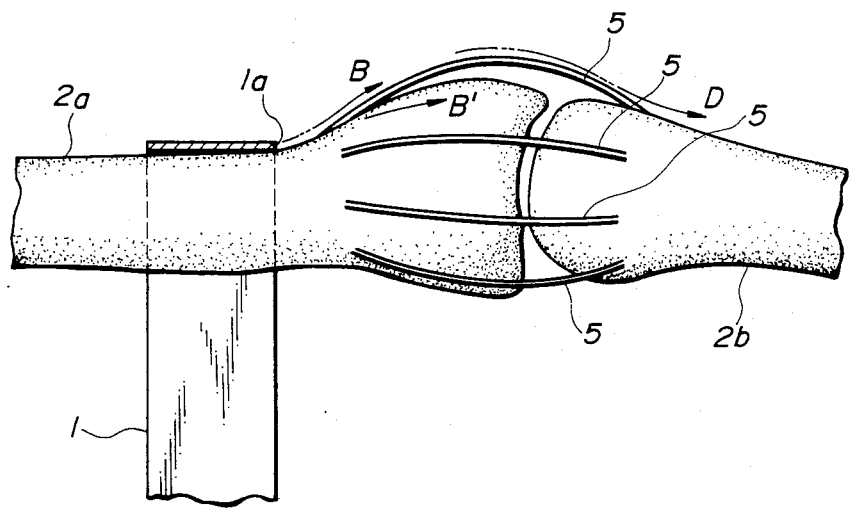

FIG. 5 schematically shows one embodiment of the boning apparatus for effecting the boning method according to the present invention. This apparatus consists of a holding unit 9 securing, by holding, a dark meat of a chicken 3, namely, a poultry leg to be boned, at the opposite ends thereof, a drive unit 6 which supports a belt-shaped cutter 1 and reciprocates the belt ends thereof alternately, a sliding base 7 on which said drive unit 6 is fixed and which is slidable with respect to a main base 13, a guide way 8 disposed on the main base 13 and having a first guide way section 8a substantially parallel to the shinbone(tibia) 2a' and a second guide way section 8b substantially parallel to the thigh bone 2b', along which the sliding base 7 is slidingly guided, and a cutter holder 6' (not shown in FIGS. 5 and 6 for the simplicity of illustration) disposed so slidably on the sliding base 6 as to move toward and away from the drive unit 6.

The holding unit 9 comprises a main body (not shown) movable with respect to the main base 13, a pivoting base 9a having nearly at the center thereof a pivot 9b rotatably supported on the main body, a pair of air cylinders 9c mounted on the pivoting base 9a, and a pair of jaw members 9b. The pair of air cylinders 9c is so arranged as to be reciprocally driven in a direction to increase and decrease the spacing the jaw members 9b in pair, and the pivoting base 9a is rotated by means of a rotation drive unit (not shown) disposed on the main body, including, for example, a motor and a reduction gear which conveys the rotation of the motor to the pivot 9d. The pivoting base 9a is rotated when the sliding base 7 having mounted thereon the drive unit 6 for the belt-shaped cutter 1 is in a predetermined position on the guide way 8 and which corresponds to the knee joint 4' of the poultry leg. Such position is detected by a well-known detection means, and the motor of the rotation drive unit is driven correspondingly to the detection signal from the detection means so that the pivoting base 9a will be pivoted about 15° clockwise in the plane of FIG. 5.

For fixing a poultry leg 3 by the above-mentioned holding unit 9 in the pre-processing stage of the boning procedure, the ends of the shinbone 2a' and thigh bone 2b' are grasped by the jaw members 9b in pair, respectively, and the latters are moved away from each other by extending the pair of air cylinders 9c, whereby the knee joint 4' coupling the shinbone 2a' and thigh bone 2b' is stretched. It is empirically known that the knee joint 4' is stopped from being stretched when the bending angle $\theta$ shown is about 15° unless such an excessively large force as will crush the tissue of the knee joint 4' is applied. So, the position for the maximum stroke of the air cylinders 9c is preset for the bending angle to be approximately 15°. In this condition, the poultry leg 3 will be held as fixed.

The sliding base 7 on which the drive unit 6 is fixed has rotatably provided thereon rollers which permit to slide the sliding base 7 along the guide way 8 on the main base 13. In this embodiment, the guide way 8 consists of three ways so formed on the main base 13 that the distances between the drive unit 6 and the bones 2a' and 2b', respectively, are kept generally constant (L) when the sliding base 7 moves along the guide way 8. The means of driving the sliding base 7 is not illustrated, but this driving is obtained by disposing a rack along the guide way 8 on the main base 13, a pinion on the sliding base 7, which engages with the rack, and a motor which drives the pinion.

The drive unit 6 on the sliding base 7 comprises a pair of air cylinders 14. The belt-shaped cutter 1 is wound on the bone of the poultry leg 3, and the opposite ends of the belt are fixed to the air cylinders 14, respectively. In this condition, the boning procedure is started. After completion of the boning of a poultry leg, the belt-shaped cutter 1 is removed from the bones, wound on the bone of a next poultry leg to be boned, and fixed at the opposite ends thereof to the air cylinders 14. For this purpose, the boning apparatus according to the present invention is provided with a unit for attaching-/detaching the belt-shaped cutter 1 to/from the drive unit 6. This unit comprises a cutter holder 6' (see FIG. 9) which holds the belt-shaped cutter 1 removed from the drive unit 6. The belt-shaped cutter 1 has a pair of fasteners 6a at the opposite ends thereof, and attached to the reciprocal drive unit 6 as bent in a U form. In this embodiment, the reciprocal drive unit 6 has two air cylinders 14 each of which has fixed thereto a fastener receiver 6b (schematically shown in FIG. 8) which detachably supports the end of said air cylinder 14. Each of the air cylinders 14 is extended and retracted alternately by means of a valve (not shown) operatively controlled by a well-known automatic control means (not shown). The fastener receiver 6b may be composed of, for example, a well-known tool changer to detachably hold a tool, etc. and which has an opening into which the fastener 6a is received.

The above-mentioned reciprocal drive unit 6 is fixed on the sliding base 7, and as shown in FIG. 8, the cutter holder 6' (not shown in FIGS. 5 and 6) is disposed on the sliding base 7 as opposite to the reciprocal drive unit 6. The cutter holder 6' has a U-shaped recess 15 for receiving the belt-shaped cutter 1 bent in the U form, as shown in FIG. 9. The cutter holder 6' has an opening 16 directed toward the reciprocal drive unit 6, and it is fitted on the surface of the recess 15 owing to its own elastic force. It will be obvious that the belt-shaped cutter 1 can be easily received by the cutter holder 6' and also easily extracted from inside the holder 6'.

The sliding base 7 is so constructed as to slide as driven by the drive unit (not shown) in the directions of arrows N and N' along the guide way 8 consisting of the first and second guide ways 8a and 8b substantially parallel to the bones 2a and 2b. The cutter holder 6' which slides along with the sliding base 7 in the directions of arrows N and N' is slidable also in the directions of arrows Q and Q'. This cutter holder 6' is driven by the cylinder 18 fixed on the sliding base 7. When the cylinder 18 is extended or projected, the cutter holder 6' slides in the direction of arrow Q, namely, in the direction toward the drive unit 6. As the cylinder 18 is retracted, the cutter holder 6 is slid in the direction of arrow Q', that is, in the direction away from the drive unit 6.

The winding and removing of the belt-shaped cutter 1 onto and from the bone using the cutter attaching-/detaching unit of the above-mentioned design will be described below.

First, the belt-shaped cutter 1 is bent into a U form as shown in FIG. 9 and put into the cutter holder 6' so that its outer circumference fits the surface of the recess 15 in the cutter holder 6'.

The pre-cooked poultry leg 3 is held by the pair of jaw members 9b. The poultry leg will be severed as indicated at 10 longitudinally of the bone and also cut circumferentially as indicated at 11, which will be described later. When the holding unit 9 is moved to an intermediate position between the drive unit 6 and the cutter holder 6', the poultry leg 3 is set in a position where the cutter belt 3 will be wound on it. The holding unit 9 is not shown in FIG. 8 for the simplicity of the illustration. In the condition shown in FIG. 8, the pair of fasteners 6a and the pair of fastener receivers 6b are so positioned as to form together an rectangle klmn, and the portion of the poultry leg 3 near the ankle part J is positioned horizontally through a position near the center of the rectangle (generally perpendicular to the plane formed by the corners k, l, m and n of the rectangle).

As the attaching/detaching cylinder 18 is extended to slide the cutter holder 6' in the direction of arrow Q, the belt-shaped cutter 1 maintained in the U form is put onto the bone 2a'. As the cutter holder 6' is further slid in the direction of arrow Q until the pair of fasteners 6a is engaged into the pair of fastener receivers 6b, the belt-shaped cutter 1 is wound on the bone 2a'.

After the winding of the cutter 1 onto the bone 2a', the cylinder 18 is retracted to reverse the cutter holder 6' in the direction of arrow Q'. The belt-shaped cutter 1 can be easily extracted from inside the cutter holder 6' since it is fixed to the pair of fastener receivers 6b. Thereafter, the pair of air cylinders 14 is extended and retracted alternately to reciprocate the belt-shaped cutter 1 wound on the bone 2a' circumferentially of the bone 2a', while the sliding base 7 is moved along the bones 2a' and 2b' in the directions of arrows N and N' toward the joint of thigh. The meat of the poultry leg 3 is thus separated from the bones by the belt-shaped cutter 1.

When the boning is complete with the belt-shaped cutter 1 having reached the end T of the thigh bone 2b', the meat portions 3a and 3b drop from the bones. In this condition, the cylinder 18 is projected to slide the cutter belt 1 in the direction of arrow Q. When the outer circumference of the belt-shaped cutter 1 fits the surface of the recess 15 in the cutter holder 6', the cylinder 18 is stopped from projecting. And the cutter holder 6' is reversed in the direction of arrow Q' by retracting the cylinder 18 after the fastener 6a is detached from the fastener receiver 6b. Thus, the apparatus is ready for a next boning procedure.

The previously-mentioned bone-longitudinal severe 10 and and circumferential cut 11 are made actually before the belt-shaped cutter 1 is wound on the shinbone 2a'. The severe 10 is made into the poultry leg 3 along the bones 2a' and 2b' from the ankle part J of the shinbone 2a' at the opposite side to that on which the belt-shaped cutter 1 is to be wound. This severing is done using a cutting device like knife. Also, the circumferential cut 11 is made in the poultry leg 3 neart the ankle part J using another cutting device. The circumferential cut 11 is made for the belt-shaped cutter 1 to easily be inserted at the boundary between the meat and bone of the poultry leg 3, while the bone-longitudinal severe 10 is made for the purpose that the meat with which the cutter belt 1 is not in contact should depend owing to its own weight. These severe and cut are made for smooth boning.

Figure 10:
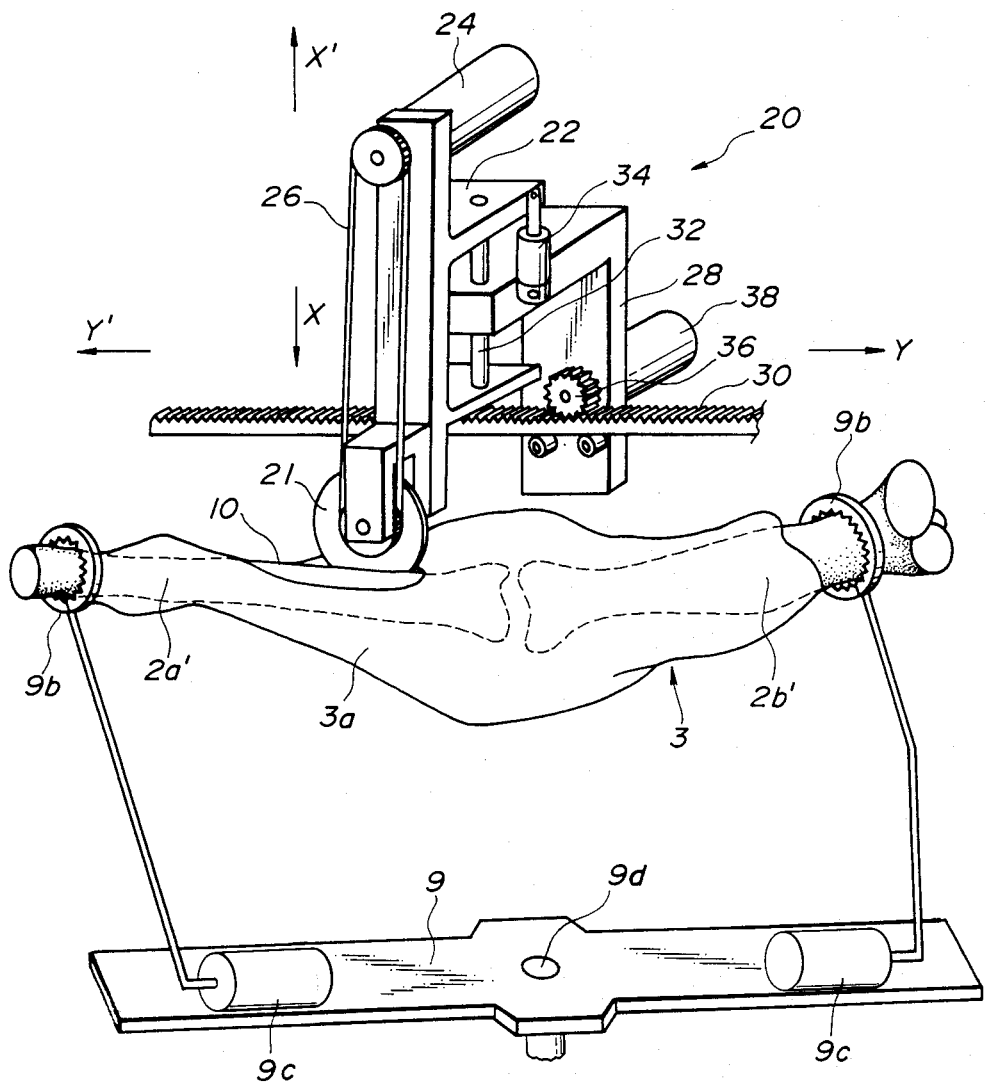
FIG. 10 is a schematic perspective view of the cutting device which gives a longitudinal severe in the poultry leg.

The severe 10 is made by means of an appropriate cutting device such as a knife in the bone-longitudinal meat from the ankle part J. This severing may be done manually by the boning worker; it should preferably be made using a cutting device 20 having a disk-blade cutter 21 as shown in FIG. 10, which is suitable for boning many poultry legs.

The disk-blade cutter 21 is rotatably supported on a cutter fixing plate 22 and driven by means of a motor 24 fixed on the plate 22 via a belt 26. The plate 22 is mounted on a base 28 movably substantially perpendicularly to the latter. The base 28 is movably mounted on a fixing base (not shown) on which a horizontally extending rack 30 is fixed. Provided through the base 28 is a guide 32 of which the one end is fixed to the plate 22 and the other end extends substantially vertically. A cylinder 34 is fixed on the base 28, which moves the plate 22 in the direction in which the guide 21 extends. The cylinder 34 is normally extended. The rod end of the cylinder 34 is fixed to the plate 22, and by extending and retracting the rod, the disk-blade cutter 21 can be moved substantially vertically. The base 28 has supported thereon a pinion 36 which engages with the rack 30 fixed to the fixing base. By driving the pinion 36 by a motor fixed on the fixing base, the base 28 can be moved horizontally.

For making the severe 10 using this cutting device 20, the movable main body (not shown) of the holding unit 9 is first moved to such a position that the shinbone 2a' and thigh bone 2b' are substantially parallel to the rack 30 and that the outer circumference of the shinbone 2a' substantially corresponds to the illustrated one side of the disk-blade cutter 21. Next, the motor 38 is put into operation to slide the base 28 to a position corresponding to the ankle part J of the shinbone 2a'. By retracting the cylinder 34 to lower the plate 22, for thereby driving the motor 22, the disk-blade cutter 21 starts cutting the skin and meat near the ankle part J, and by stopping the cylinder 34 from being retracting when the plate is lowered a predetermined distance and rotating the pinion 36 as driven by the motor 38, the base 28 is moved in the direction of arrow Y. Thus, the disk-blade cutter 21 moves, while rotating, along the outer circumference of the shinbone 2a' and the thigh bone 2b' and severs the meat along these bones 2a' and 2b' to a predetermined depth in the direction of arrow X. Therefore, the meat portion facing the cutting device 20 will depend down owing to its own weight after thus severed, and the bones 2a' and 2b' will be partially exposed. When the motors 24 and 38 are stopped, the severing is ended. By making the motor 38 run reversely after raising the plate 22 in the direction of arrow X' by extending the cylinder 34, for thereby returning the base 28 to its initial position by moving it in the direction of arrow Y', the procedure for making the severe 10 is complete.

Figure 11:
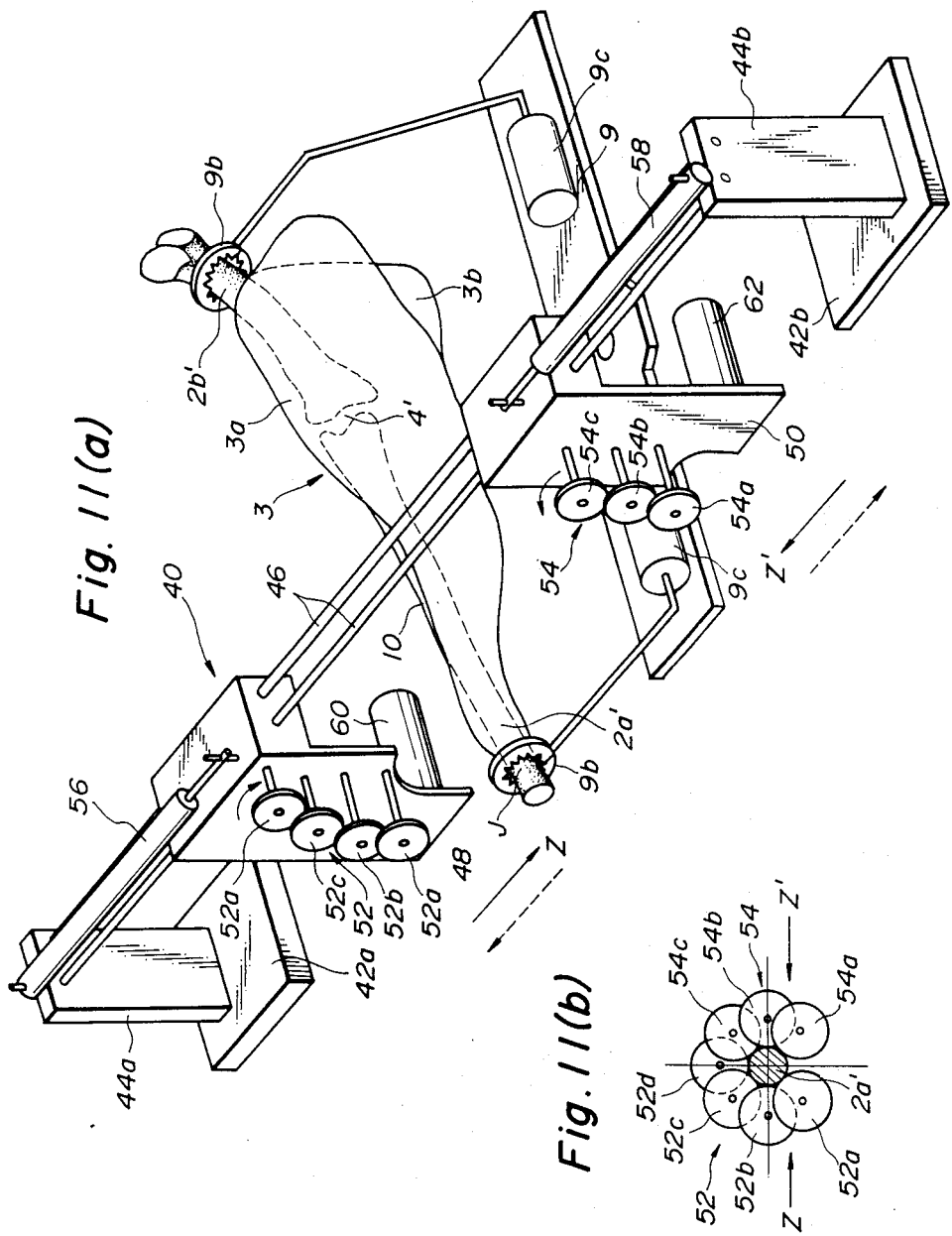
FIG. 11 (a) is a schematic perspective view of the cutting device which gives a circumferential severe in the poultry leg at a position near the ankle part.

The above-mentioned circumferential cut 11 can be made manually by means of an appropriate cutting device such as knife or the like as in making the severe 10, but it may be formed using the cutting assembly 40 shown in FIG. 11 (a).

This cutting assembly 40 is composed of a pair of cutting devices 48 and 50 disposed horizontally slidably as guided on two parallel guide rails 46 provided between fixing plate members 44a and 44b in pair fixed perpendicularly to fixing bases 42a and 42b in pair.

The fixing plate 44a has fixed at the top thereof an air cylinder 56 of which the rod end is fixed to the top of the cutting device 48. Also, the fixing plate 44b has fixed at the top thereof an air cylinder 58 of which the rod end is fixed to the top of the cutting device 50. By extending and retracting these air cylinders 56 and 58, the cutting devices 48 and 50 are moved horizontally.

The cutting device 48 is provided with four rotatable disk-blade cutters 52a, 52b, 52c and 52d having their respective rotating shafts perpendicular to the sliding direction of the cutting device 48 and which are positioned as axially displaced a little from one another, a motor 60 which drives these disk-blade cutters 52, and a transmission (not shown) for rotating the four disk-blade cutters 52a, 52b, 52c and 52d simultaneously and in a same direction.

On the other hand, the cutting device 50 is also provided with three rotatable disk-blade cutters 54a, 54b and 54c having their respective rotating shafts disposed perpendicularly to the sliding direction of the cutting device 50 and which are positioned as axially displaced a little from one another, a motor 62 for driving the disk-blade cutters 54a, 64b and 54c, and a transmission (not shown) for rotating these three disk-blade cutters 54a to 54c simultaneously and in a same direction.

In this embodiment, the above-mentioned disk-blade cutter groups 52 (52a to 52d) and 54 (54a to 54c) are made of a quenched stainless steel of 40 mm in diameter and 1 mm in thickness. The spacing in the rotating direction between the two adjoing cutters is kept about 0.1 mm.

As seen from FIG. 11 (a), the poultry leg 3 is positioned in advance between the cutting devices 48 and 50. The disk-blade cutters 52a and 54a form together one plane. The disk-blade cutters 52b and 54b form together another plane. The disk-blade cutters 52c and 54c form together a further plane. These planes are spaced in parallel from one another with distances of about 0.1 mm. The disk-blade cutters 52a to 54d and those 54a to 54c in the disk-blade cutter groups 52 and 54, respectively, are so disposed as to touch the circumference of the thigh bone 2a' when the cylinders 56 and 58 are projected nearly to their respectively maximum strokes, as shown in FIG. 11 (b). Such cutting device 40 is used to make a circumferential cut 11 (see FIG. 8) at a position near the ankle part J of the shinbone 2a'. For this purpose, the motors 60 and 62 are driven to rotate the disk-blade cutters 52a to 52d clockwise but the disk-blade cutters 54a to 54c counterclockwise, respectively, and the air cylinders 56 and 58 are extended nearly to their respective maximum strokes in the directions of arrows Z and Z'. When any of the disk-blade cutters in the groups touches the outer circumference of the shinbone 2a', the air cylinders 56 and 58 are stopped from projecting and quickly retracted in the direction of arrow indicated with dash line. The circumferential cut 10 is thus formed.

The disk-blade cutters are spaced about 0.1 mm from one another, but it will be obvious that since the cutters are of about 1 mm in thickness, a continuous circumferential cut 11 can be formed in practice.

In FIG. 11 (a), the disk-blade cutter is shown not touching a part of the lower circumference of the shinbone 2a'; this is because such an arrangement is adopted that a splint bone (not shown) in the poultry leg 3 is not cut. If the splint bone is cut, the belt-shaped cutter 1 will cut into the knee joint 4' in the subsequent boning process.

Figure 12:
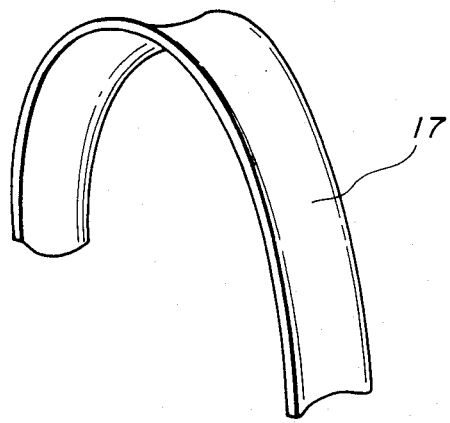
FIG. 12 is also a schematic perspective view of the belt-shaped cutter used in the boning apparatus according to the present invention.

FIG. 12 is a schematic perspective view of one embodiment of the belt-shaped cutter 17 constructed optimally for use in the inventive boning apparatus. This belt-shaped cutter 17 is so constructed that the section taken along the plane perpendicular to the length of the cutter has at least an arched portion 17a. In this embodiment, the cross-section 17a is formed as arched configuration.

Figure 13:
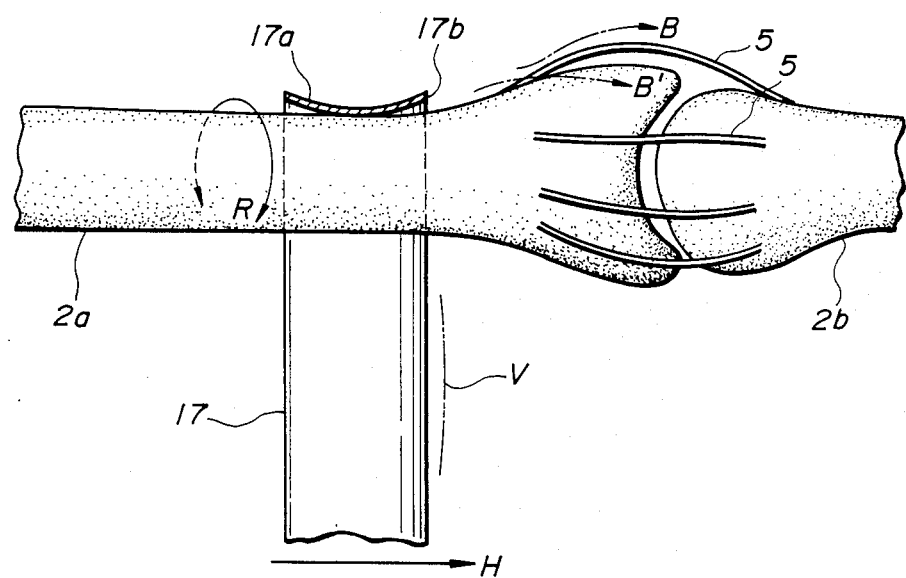
FIG. 13 is an illustration explaining the action of the belt-shaped cutter shown in FIG. 12.

The belt-shaped cutter 17 made as having been described in the above is not prevented from moving circumferentially along the bone in the direction of arrow R as shown in FIG. 13 and also represents a large rigidity against being as indicated with a two dot and dash line V. Therefore, as the base of the belt-shaped cutter is moved in the direction of arrow H, its wound portion precisely follows up with the movement of the base, for thereby efficiently boning the poultry leg or the meat.

Since the section 17a is arched, any relative sharp blade provided on the lateral edge 17b would not possibly cut into the ligaments 5 or bone 2a as indicated with the arrow B', but slide smoothly on the ligaments 5, for thereby effectively separating the meat from the bone.

FIG. 14 shows a variation of the above-mentioned belt-shaped cutter of which the section is arched at pulral portions, namely, wave-shaped. FIG. 15 shows a yet another embodiment of which the section consists of an arched portion 17c and a straight portion 17d and is asymmetrical with respect to the line Y—Y'.

FIG. 16 shows a still another embodiment of the belt-shaped cutter, an application of the embodiment shown in FIG. 15, in which the numerals 17d and 17d' denote straight sectional portions while 17c' indicates an arched sectional portion. The radius of curvature r of the arched portion 17c' is minimized so as to provided an angular section. The arched portion in the present invention means an arch of which the radius of curvature is infinitely small as in the embodiment shown in FIG. 16. These embodiments described above provide the same effects as the first embodiment.

FIG. 17 shows an application of the belt-shaped cutter 17 in FIG. 13, which is different in that the belt-shaped cutter is so wound on the bone 2c that the arched sectional portion is convex with respect to the bone 2c. This use of the cutter leads to a special effect that the amount of the meat remained attached to the bone is minimized, namely, the yield of boning is high. Also there is no fear that the cutter belt will deflect as shown with the two dot and dash line V.

As having been described in the above, the belt-shaped cutter has at least an arched cross section perpendicular to the length thereof, so that, of made of a thin elastic material, it can slide smoothly on the bones longitudinally thereof by precisely following up with the movement of the drive unit, and separates the bone from the meat with a high efficiency and without any fear that the cutter blade will cut into the ligaments and bones.

As will be obvious from the foregoing description, a severe is made into the poultry leg along the bones 2a' and 2b' (on the opposite side to that where the belt-shaped cutter is wound) at the pre-processing stage of the boning procedure at which the cutter is wound on the bone, the cut meat will depend down from the side where the belt-shaped cutter is not wound, owing to its own weight. Thus, the meat actually cut by the belt-shaped cutter is the remainder of the meat which is not severed as in the above.

What is claimed is:

1. A method of boning a poultry leg including a thigh bone and tibia therein using a belt-shaped cutter, comprising the following steps of:
   grasping a poultry leg at the opposite ends thereof in such a manner that the thigh bone and tibia in said poultry leg will form a predetermined angle between them;
   winding said belt-shaped cutter on said poultry leg at a portion of the bone near one end of said leg and holding said belt-shaped cutter with a constant tension applied thereto;
   reciprocally driving the ends of said belt-shaped cutter alternately in a direction perpendicular to the length of said bone; and
   sliding said belt-shaped cutter along said bone in the longitudinal direction thereof while reciprocally driving said belt-shaped cutter, in which step a base on which a drive means of providing the reciprocal movement of said belt-shaped cutter is mounted is guided slidingly along such a guide that constant distances are kept between said base and the thigh bone and tibia, respectively.

2. A method according to claim 1, further comprising the step of:
   temporarily pivoting a means of grasping the poultry leg at the opposite ends thereof is such a manner that when the belt-shaped cutter wound on said bone passes by the knee joint of said bone, said belt-shaped cutter is kept perpendicular to the length of another bone adjoining said knee joint.

3. A method according to claim 1, comprising a further step of:
   moving the base on which said drive means for said belt-shaped cutter is mounted in such a direction that when the belt-shaped cutter wound on said bone passes by the knee joint of said bone, the tension of said belt-shaped cutter is temporarily reduced.

4. An apparatus for boning a poultry leg including a thigh bone and tibia therein using a belt-shaped cutter, comprising:
   means of grasping a poultry leg at the opposite ends thereof in such a manner that the thigh bone and tibia in said poultry leg will form a predetermined angle between them;
   a pair of fastener pieces fixed to the opposite ends of said belt-shaped cutter which is to be wound on the poultry leg at a portion of the bone near one of said leg;
   means provided with a pair of fastener receivers provided correspondingly to said pair of fasteners and which detachably catch said fastener pieces, respectively, and which reciprocates the opposite ends of said belt-shaped cutter alternately in a direction perpendicular to the length of said bone;
   sliding base having said reciprocal-drive means fixed thereon and which is slidable along the longitudinal direction of said thigh bone and tibia; and
   a cutter holder provided slidably on said sliding base and which has a receiving surface of a U-section for supporting said belt-shaped cutter in a U form;
   said poultry leg being held in a position between said reciprocal-drive means and said belt-shaped cutter, said fastener pieces of said belt-shaped cutter being attached to or detached from said respective fastener receivers of said reciprocal-drive means by moving said cutter holder toward or away from said reciprocal-drive means.

5. An apparatus according to claim 4, in which said sliding base is slidable as guided by guide members formed along the length of said tibia and thigh bone.

6. An apparatus according to claim 4, further comprising:
   means of pivoting said grasping means synchronously with the passage of said belt-shaped cutter by the knee joint of said bone, whereby said belt-shaped cutter is held perpendicular to the length of another bone adjoining said knee joint.

7. An apparatus according to claim 4, in which said belt-shaped cutter is so formed as to have at least an circular portion in the section thereof taken along the length of said bone.

* * * * *